United States Patent [19]

Isshiki et al.

[11] 4,122,680

[45] Oct. 31, 1978

[54] CONCENTRATION DIFFERENCE ENERGY OPERATED POWER PLANTS AND MEDIA USED IN CONJUNCTION THEREWITH

[75] Inventors: Naotsugu Isshiki, Kyodo; Isao Nikai; Hiroyuki Uchida, both of Yokohama, all of Japan

[73] Assignee: Ishikawajima-Harima Jukogyo Kabushiki Kaisha, Ote, Japan

[21] Appl. No.: 741,033

[22] Filed: Nov. 11, 1976

[30] Foreign Application Priority Data

| Nov. 13, 1975 | [JP] | Japan | 50-135716 |
| Feb. 25, 1976 | [JP] | Japan | 51-18830 |
| May 10, 1976 | [JP] | Japan | 51-57243 |
| Jul. 7, 1976 | [JP] | Japan | 51-80533 |
| Jul. 7, 1976 | [JP] | Japan | 51-80534 |

[51] Int. Cl.² ........................................... F01K 25/06
[52] U.S. Cl. ..................... 60/649; 60/668; 60/676; 60/689
[58] Field of Search ............... 60/643, 645, 649, 659, 60/670, 673, 685, 689, 676, 668

[56] References Cited

U.S. PATENT DOCUMENTS

| 287,937 | 11/1883 | Honigmann | 60/649 |
| 340,718 | 4/1886 | Honigmann | 60/676 |
| 1,029,180 | 6/1912 | D'Equevilley-Montjustin | 60/673 |

FOREIGN PATENT DOCUMENTS

| 384,222 | 4/1908 | France | 60/673 |
| 242,980 | 8/1926 | United Kingdom | 60/673 |

*Primary Examiner*—Allen M. Ostrager
*Assistant Examiner*—Stephen F. Husar
*Attorney, Agent, or Firm*—Scrivener, Parker, Scrivener & Clarke

[57] ABSTRACT

Disclosed is a concentration difference energy operated power plant comprising an aqueous solution tank containing an aqueous solution of salts, a pure water boiler disposed within the tank and completely immersed in the aqueous solution therein, preheater means for preheating the aqueous solution in the tank to a temperature very close to the boiling temperature thereof, and a steam engine which is operated by the steam generated in the pure water boiler, the steam discharged from the steam engine being injected through nozzles into the aqueous solution in the tank, dissipating the latent heat to the aqueous solution. Also disclosed is the compositions of the aqueous solutions used in conjunction with the above power plant.

6 Claims, 10 Drawing Figures

CONCENTRATION DIFFERENCE ENERGY OPERATED POWER PLANTS AND MEDIA USED IN CONJUNCTION THEREWITH

DETAILED DESCRIPTION OF THE INVENTION

The present invention relates to concentration difference energy systems, machines fueled by these systems (power plants) and media used in these systems. Utilized for the generation of energy is the aqueous solution which is concentrated by the energy external of the concentration difference energy systems such as waste heat, solar energy, electric power generated in excess of the demand and so on so that may be attained the maximum use of the otherwise wasted low-temperature thermal energy and the waste heat and power of which supply varies.

There have been devised and demonstrated various power generating systems utilizing the concentration difference, but so far none of them has been successful in practice because they are very large in size and extremely complex in construction, requiring a large number of equipment such as pumps, tanks mixers, heat exchangers and so on.

The present invention is based on the facts observed by the inventor that the direct injection of the exhaust steam into an aqueous solution facilitates the absorption of the exhaust steam and consequently the recovery of exhaust heat and that if the heat loss is sufficiently low, the continuous generation of the steam may be possible only by the absorption or recovery of heat without the supply of heat from an external heat source such as atmosphere.

According to one preferred embodiment of the present invention, the concentration difference energy system comprises a tank containing a strong aqueous solution, a pure water boiler disposed within the tank and immersed in the strong aqueous solution and a Rankine or steam engine. Therefore the present invention may provide a concentration difference energy engine which is very simple in construction with a minimum number of components and without the use of a pump.

Thus in the light of the tendency toward the maximum use of various energy sources and of savings in energy, the present invention provides a very useful power source.

The concentration difference energy systems of the present invention may be used as power plants capable of accumulating and storing the energy. p The concentration difference energy systems and engines fueled thereby may be mounted on vehicles such as ships, automobiles, rolling stocks, bicycles, toys and so on and may be used in conjunction with portable equipment such as portable generator, emergency generators, unattended light houses and so on.

According to the present invention, the self-propelled bodies and portable equipment which may operate on various energy sources and may not contribute air pollution may be provided.

The present invention will become more apparent from the following description of some preferred embodiments thereof taken in conjunction with the accompanying drawings, in which.

Figure 1:
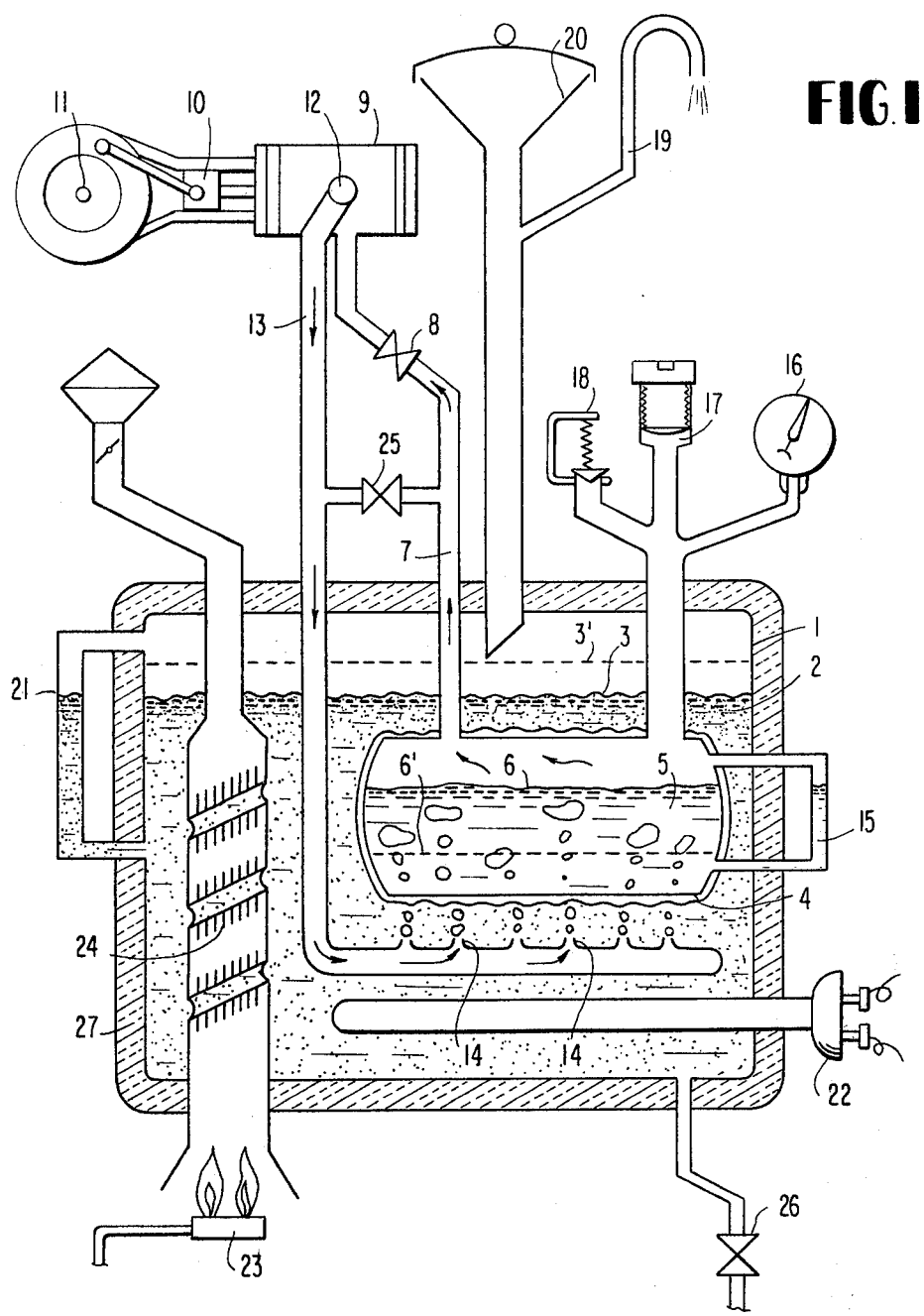
FIG. 1 is a schematic diagram of a concentration difference energy engine in accordance with the present invention.

Referring to FIG. 1, reference numeral 1 denotes a tank containing a strong aqueous solution 2 (for instance 40 – 70%) of salts such as LiBr, NaOH, $CaCl_2$, $ZnCl_2$ or the like, the level of the strong aqueous solution 2 changing between the maximum and minimum levels 3 and 3'; and 4, a pure water boiler disposed within the tank 1 and immersed in the strong aqueous solution 2 and containing pure water 5 (substantially equal in volume to about 80% of the volume of the pure water boiler 4) whose level changes between the maximum and minimum levels 6 and 6'; 7, a steam pipe having its one end communicated with the pure water boiler 4 and the other end communicated with the cylinder of a steam engine 9; 8, a valve inserted into the steam pipe 7; 10, a crosshead; 11, a flywheel; 13, a discharge pipe having its one end communicated to a discharge port 12 of the steam engine 9 and the other end terminated into a nozzle pipe extended in parallel with and spaced apart from the bottom of the pure water boiler 4 by a suitable distance and provided with a plurality of nozzle holes 14 directed toward the bottom of the pure water boiler 4 so that the exhaust steam may be injected into and bubbles through the strong aqueous solution 2, thereby facilitating the heat transfer from the strong aqueous solution 2 to the bottom of the pure water boiler 4, the latent heat of the exhaust steam being absorbed not only by the strong aqueous solution 2 but also by the pure water boiler 4 so that the strong aqueous solution 2 may rise to a temperature substantially equal to its boiling temperature and the steam may be generated in the pure water boiler 4; 15, a water gage of the pure water boiler 4; 16, a pressure gage; 17, a pure water inlet with a plug for feeding or make up the pure water 5 in the pure water boiler 4; 18, a safety valve; 19, a vent of the tank 1; 20, an aqueous solution inlet with a funnel for feeding the strong aqueous solution into the tank 1; 21, a water gage of the tank 1; 22, a preheater such as an electric heater, heating tube or coil or any other suitable means adapted for heating the strong aqueous solution 2 in the tank 1; 23, a city gas burner for concentrating the weak aqueous solution 2; 24, heat exchangers; 25, a bypass valve interconnecting between the steam pipe 7 and the exhaust pipe 13 and being opened to bypass the steam into the exhaust pipe 13 when the steam engine 9 is not operated; 26, a drain valve of the tank 1; and 27, a thermal insulating material. Instead of the drum type pure water boiler 4, any suitable boiler such as a shell and tube type, water tube type or fire tube type boiler may be used.

The strong aqueous solution 2 of 85% $ZnCl_2$ is fed in a suitable quantity into the tank 1 through the aqueous solution inlet 20, and the pure water 5 is fed in a suitable volume into the pure water boiler 4 through the pure water inlet 17 and then the inlet 17 is tightly closed. Next the preheater 22 is energized to heat both the strong aqueous solution 2 and the pure water 5 until the boiling point of the strong aqueous solution 2 is reached. In this embodiment, the strong aqueous solution contains 85% by weight $ZnCl_2$ so that the boiling point is 175° C. under the atmospheric pressure. As a result, the steam generated by the pure water boiler 4 has the pressure of about 9 $Kg/cm^2$ when the valve 8 and the bypass valve 25 are both closed.

When the pressure of the steam reaches the operating pressure in the manner described above, the preheater 22 is de-energized and the valve 8 is opened to introduce the steam through the steam pipe 7 into the steam engine 9 to drive it. The exhaust steam is discharged through the discharge port 12 and the exhaust pipe 13 and injected into the strong aqueous solution 2 through the nozzle holes 14. The injected steam agitates the strong aqueous solution 2 so that the heat transfer from the steam to the aqueous solution 2 may be much facilitated. Furthermore the latent heat of the steam is dissipated into the aqueous solution 2. Thus the temperature of the aqueous solution 2 may be maintained very closely to its boiling temperature; that is, 175° C. in this embodiment. The aqueous solution 2 in turn heats the water boiler 4 so that the fresh steam may be continuously generated.

Under these operating conditions, it is clear from Calusius-Clapeyron equation that under a constant pressure the latent heat of varporization is increased in proportion to the square of the boiling temperature in ° K. It follows therefore that the quantity of heat dissipated from the exhaust steam into the aqueous solution 2 is far greater than the quantity of heat required for generating the steam equal in weight to the exhaust steam even though there are some heat losses and the work done by the steam in the steam engine 9. Thus the continuous generation of the steam in the pure water boiler 4 becomes possible. In this embodiment, whereas the quantity of heat required for generating one kilogram of the steam in the pure water boiler 4 is 485 KCal/kg, the heat quantity of 1 Kg of the steam dissipated into the strong aqueous solution 2 is about 727 KCal/kg at 175° C. The work is done in the steam engine 9 so that the quality of the steam (that is, the degree of moisture content in the steam) is decreased accordingly. In this embodiment, the quality of steam is 88% at the discharge port so that the actual heat dissipation drops to 88% of the theroetical value of 727 KCal/kg; that is, to about 640 KCal/kg, which is still for greater than 485 KCal/kg and about 1.3 times as much as the latent heat of vaporization of pure water. Therefore in the concentration difference energy engine in accordance with the present invention the steam generation may be continued without an additional supply of heat, but in practice the pressure and temperature in the pure water boiler 4 gradually decrease with the decrease in concentration of the strong aqueous solution 2 due to the absorption of steam and thermal resistance caused by the boiling of the water and thermal losses. Therefore when the concentration and hence boiling point of the strong aqueous solution 2 drops to a certain level, the pressure and temperature of the steam drop too low to drive the steam engine 9. In this embodiment the steam engine 9 may be driven until the boiling point of the aqueous solution 2 drops below about 130° C. Therefore when 20 kg of 85% $ZnCl_2$ solution and 8 kg of pure water are initially fed, the steam engine may be driven until this pure water is completely evaporated. The output of the steam engine 9 may be used to drive any suitable machines such as a generator, refrigerator or the like.

When the steam engine 9 is stopped for a relatively short time, the bypass valve 25 is opened to bypass the steam into the exhaust pipe 13 to keep the temperature of the system. The weakened aqueous solution 2 may be drained from the tank 1 and strengthened or enriched by a suitable concentration device. Alternatively, the preheater 22 and or the gas burner 23 may be turned on to vaporized excessive water in the aqueous solution 2. After the aqueous solution 2 has been enriched in either way, the steam engine 9 may be driven again in the manner described above.

Figure 2:
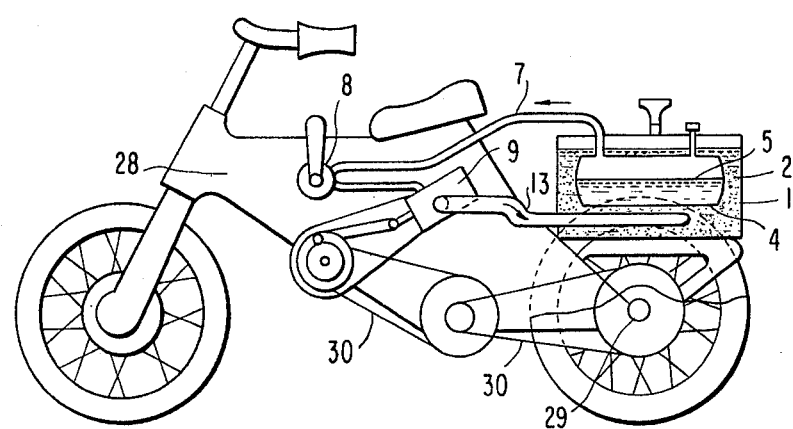
FIG. 2 shows a tricycle driven by the concentration difference energy engine.

In FIG. 2, the concentration difference energy engine is shown as being mounted on a tricycle. Reference numeral 28 denotes a frame; 29, a driving shaft; and 30, chain for transmitting the power from the steam engine 9 to the driving shaft 29. With 20 kg of 85% $ZnCl_2$ aqueous solution and 8 kg of pure water 5, the output is about one PS-hour. Therefore when the tricycle is light, it may travel over about 30 kilometers for 1.5 hours with an average torque of ⅔ PS.

In the hybrid engine consisting of the concentration difference energy engine in accordance with the present invention and the Rankine engine, the temperature difference between a high temperature source and a low temperature source is effectively utilized when the temperature difference is higher than the boiling point of an aqueous solution, and in the Rankine cycle the concentration of the aqueous solution is effected so that the low-density thermal energies and the variable or unstable thermal energies may be effectively recovered, accumulated and utilized by the multistage condensation as will be described in detail hereinafter.

Figure 3:
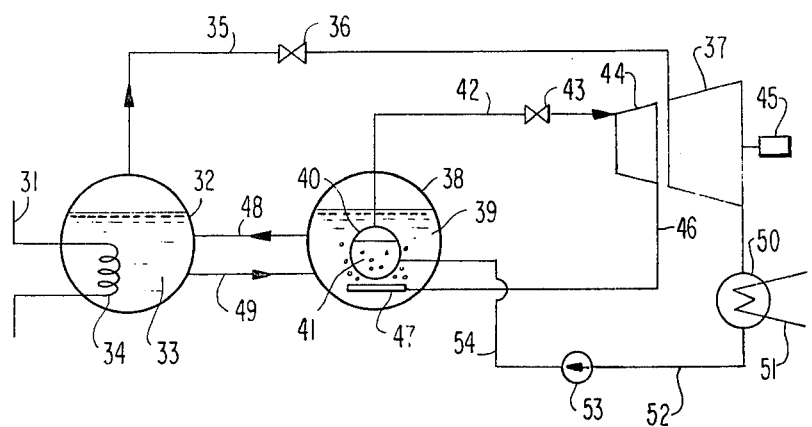
FIG. 3 is a diagram of a hybrid power plant consisting of a concentration difference energy engine in accordance with the present invention and a Rankine engine.

In FIG. 3 there is shown a module of a multistage hybrid engine. Reference numeral 31 denotes a high-temperature heat source of which thermal energy is transferred through a heat exchange 34 to an aqueous solution 33 in concentrator 32 to vaporize water thereby concentrating the aqueous solution 33. The steam generated in the concentrator 32 is delivered through a steam pipe 35 inserted with a valve 36 to a low pressure steam engine 37. As with the case of the first embodiment described previously with reference to FIG. 1, a pure water boiler 40 containing pure water 41 is immersed in an aqueous solution 39 in an aqueous solution tank 38, and the steam generated in the pure water boiler 40 is delivered to a high-pressure steam engine 44 through a steam pipe 42 with a valve 43 inserted therein. The high-and low-pressure steam engines 44 and 37 are operatively coupled to each other and their output shaft 45 may be coupled to any suitable power consuming machines such as a generator, compressor and so on. The exhaust steam from the high-pressure steam engine 44 is returned through a discharge pipe 46 to the aqueous solution tank 28 and injected into the aqueous solution 39 through nozzle holes 47.

Therefore the aqueous solution tank 38, the aqueous solution 39 in the tank 38, the pure water boiler 40, the pure water 41 in the boiler 40, the steam pipe 42 with the valve 43, the high-pressure steam engine 44, the exhaust pipe 46 and the nozzle holes 47 constitute concentration difference energy engine substantially similar in construction to that shown in FIG. 1.

The concentrator 32 and the aqueous solution tank 38 are communicated hydraulically with each other through a supply pipe 49 and a return pipe 48 so that the enriched aqueous solution may be supplied through the supply pipe 49 into the aqueous solution tank 38 while the weakened aqueous solution may be returned to the concentrator 32 through the return pipe 48. This circulation of the aqueous solution between the concentrator 32 and the tank 38 may be of the natural or forced type. The steam discharged from the low pressure steam engine 37 is condensed by a condenser 50 communicated with a low-temperature source 51 so that the condensed water may be returned through pipes 52 and 54 and a feed pump 53 to the pure water boiler 40.

Therefore the high-pressure, high-temperature source 31, the concentrator 32, the aqueous solution 33 in the concentrator 32, the steam pipe 35 with the valve 36, the low-pressure steam engine 37, the condenser 50, the low-temperature heat source 51, the pipes 52 and 54, the feed pump 53 and the heat exchanger 34 constitute a Rankine engine.

Next the mode of operation will be described. The thermal energy from the high-temperature source 31 is dissipated through the heat exchanger 34 into the aqeuous solution 33 in the concentrator 32, whereby the aqueous solution 33 is concentrated. The concentrated or strong aqueous solution is fed through the supply pipe 49 into the aqueous solution tank 38, where the strong aqueous solution absorbs the steam injected through the nozzle holes 47 and is weakened. The weakened aqueous solution is returned through the return pipe 48 to the concentrater 32. In the aqueous solution tank 38, the strong aqueous solution 39 receives thermal energy from the steam injected therein and in turn gives it to the pure water boiler 40 so that the pure water 41 is evaporated. The steam generated in the concentrator 32 is delivered through the pipe 42 with the valve 33 into the low-pressure steam engine 37 and after having done a work, the steam is condensed in the condenser 50, dissipating the heat to the low temperature heat source 51. The condensed water is returned through the pipes 52 and 54 by the feed pump 53 into the pure water boiler 40. Thus the steam generated in the concentrator 32 drives the Rankine engine.

The steam generated in the pure water boiler 40 has a pressure higher than the steam generated in the concentrator 32. The reasons have been already explained previously. The steam generated in the pure water boiler 40 is delivered through the steam pipe 42 and the valve 43 into the high pressure steam engine 44, and after having done a work equivalent to the increase in boiling temperature $\Delta T°$ C., the steam is returned through the return pipe 46 and is injected through the nozzle holes 47 into the aqueous solution 39 in the tank 38. The latent heat of the steam is absorbed by the strong aqueous solution 39 which in turn gives the heat to the pure water boiler 40 to evaporate the pure water 41 to produce the steam. This is the cycle of the concentration difference energy engine.

The single-stage concentration difference energy engine described above does a work which is dependent on the elevation in boiling point $\Delta T°$ C. of the strong aqueous solution used so that when the temperature difference between the high and low temperature sources is higher than the elevation in boiling point $\Delta T°$ C., the effective use of the steam generated in the concentrator is difficult.

However, in the hybrid engine shown in FIG. 3, the steam generated in the concentrator 32 is delivered to the low-pressure engine 37 so that may be done a work corresponding to the difference in temperature between the steam and the low temperature heat source 51. Therefore the efficiency of the concentration difference energy engine is considerably improved. A plurality of the hybrid engines of the type described with reference to FIG. 3 may be combined with a multistage concentration cycle as will be described in detail hereinafter so that the waste heat may be more effectively recovered and utilized.

Figure 4:
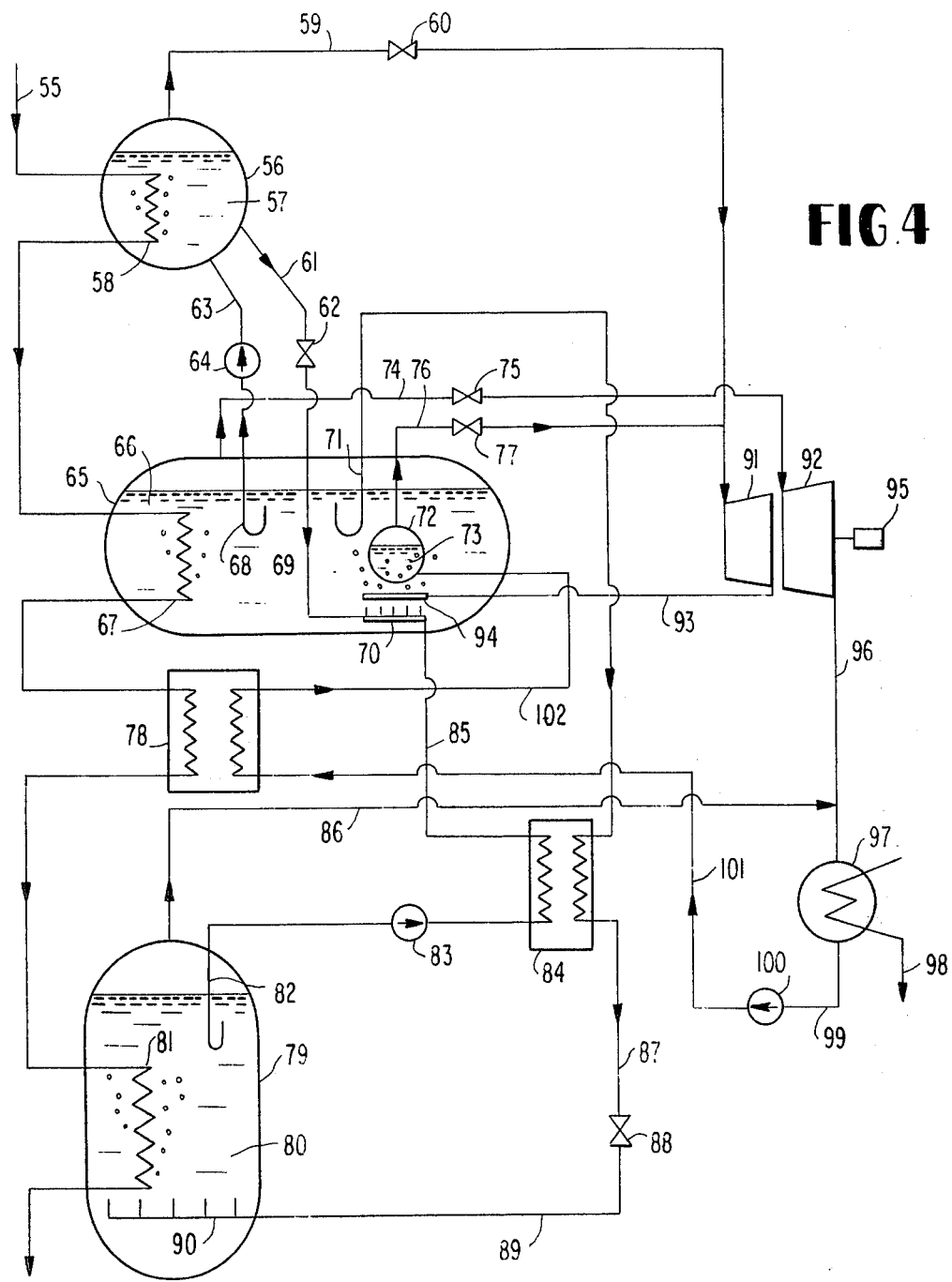
FIG. 4 is a diagram of a hybrid power plant similar to that shown in FIG. 3 but consisting of three stages.

In FIG. 4 there is shown a hybrid engine which is a modification of the hybrid engine shown in FIG. 3 and in which the concentration is effected in three stages. Reference numeral 55 denotes a waste heat source of which thermal energy is transferred through heat exchangers 58,67 and 81 to aqueous solution 57,66 and 80 in aqueous solution tanks 56,65 and 79 and the aqueous solution is enriched. Therefore the temperature drop of waste heat occurs in three stages. The enriched or strong aqueous solution is delivered to the aqueous solution tank 65 as will be described in detail hereinafter, and the aqueous solution 66 in the aqueous solution tank 65 supplies the energy for driving a concentration difference energy engine consisting of a pure water boiler 72, pure water 73 in the boiler 72, a steam pipe 76, a valve 77 inserted in the pipe 76, high pressure steam engine 91 and an exhaust pipe 93 which is terminated into a nozzle section with a plurality of nozzle holes 94.

The strong aqueous solution in the aqueous solution tank 56 flows through a pipe 61, is reduced in pressure through a pressure reduction valve 62 and is delivered through a supply pipe 69 and injected through nozzle holes 70 into the aqueous solution 66 in the solution 65. Dissipating the heat of absorption, weakened aqueous solution in the tank 65 flows into a pipe 63, is pressurized by a feed pump 64 and is returned through a pipe 63 into the aqueous solution tank 56. The strong aqueous solution which is enriched around the heat exchanger 67 flows by the natural circulation toward the steam injection nozzle holes 94 to absorbe heat from the injected steam. The heat cissipated and weakened aqueous solution flows by the natural circulation toward the heat exchanger 67.

The strong aqueous solution 80 which is enriched by the heat transferred through the heat exchanger 81 in the third aqueous solution tank 79 flows into a pipe 82, is pressurized by a feed pump 83, is heated in a heat exchanger 84, flows through a pipe 85 and is injected through the nozzle holes 70 into the second aqueous solution tank 65. The heat dissipated and weakened aqueous solution in the second tank 65 flows through a pipe 71, the heat exchanger 84, a pipe 87, a valve 88 and a pipe 89 and is injected through injection nozzles 90 into the third aqueous solution tank 79.

Next the circulations of the steam generated in the first, second and third aqueous solution tanks 56,65 and 79 will be described. The steam which is generated in the first aqueous solution tank 56 is delivered through a pipe 59 and a valve 60 inserted therein into the high-pressure steam engine 91, and after being expanded or having done a work in the steam engine 91, the steam is exhausted through the exhaust pipe 93 and is injected into the second aqueous solution tank 65 through the nozzle holes 94.

The steam generated in the second aqueous solution tank 65 is delivered through a pipe 74 and a valve 75 inserted therein into a low-pressure steam engine 92, and after having done a work, the steam flows into an exhaust pipe 96 into a condenser 97, where it gives up the heat to a low-temperature source 98. The condensed water is delivered through a pipe 99, a feed pump 100, a pipe 101, a heat exchanger 78 and a pipe 102 into the pure water tank 72. In the heat exchanger 78 the condensed water is pre-heated.

The steam generated in the third aqueous solution tank 79 is delivered through a pipe 86 into the condenser 97, and the condensed water is delivered to the pure water tank 72 in the second aqueous solution tank 65 in the same manner as described above.

The high- and low-pressure steam engines 91 and 92 operatively coupled to each other, and the power may be transmitted through an output shaft 95 to any power consumption devices such as a generator, compressor and the like. It is to be understood that instead of the waste heat source, any other suitable heat sources may be used.

Figure 5:
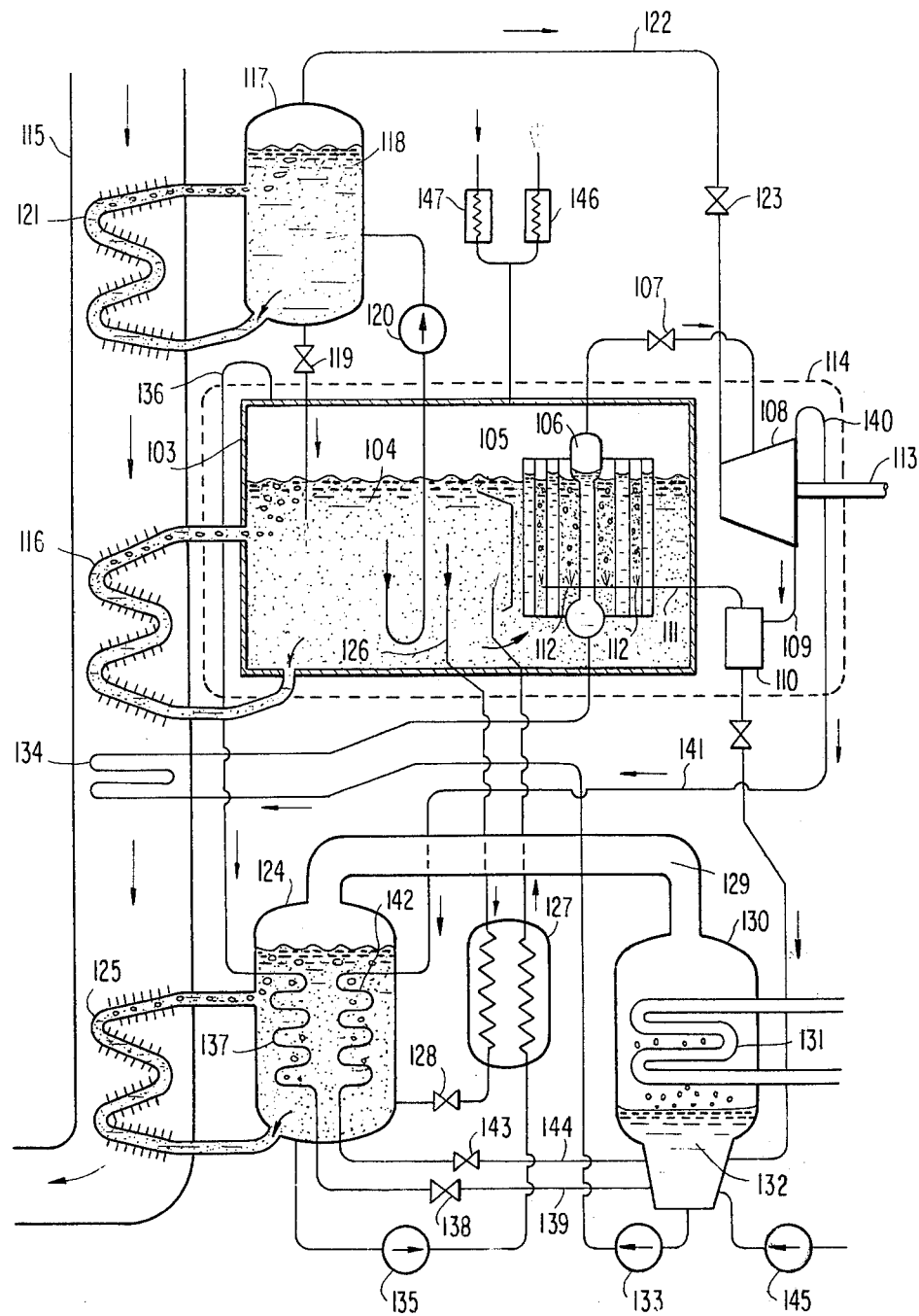
FIG. 5 shows a modification of the power plant shown in FIG. 4, utilizing waste heat.

In FIG. 5 there is shown a modification of the hybrid engine shown in FIG. 4. This modification contemplates more effective use of waste heat by concentrating aqueous solution in high-, moderate- and low-temperature stages. The steam generated in the high-temperature stage is delivered to a steam turbine or the like, whereas the steam generated in the moderate-temperature stage is delivered to the low-temperature stage for concentrating aqueous solution.

In FIG. 5 reference numeral 103 denotes an aqueous solution tank the inside of which is maintained at the atmospheric pressure and which contains a strong solution 104 of any kinds of salts. 105 is a steam generator which contains pure water and is immersed in the strong aqueous solution 103 in the tank 103. The steam generated in the steam generator 105 is delivered through a steam pocket 106 and a valve 107 to a steam turbine 108. 109 is an exhaust pipe of the steam turbine 108 and is communicated with a separator 110. The steam from the separator 110 flows through a pipe 111 and is injected through a plurality of injection nozzle holes 112 into the strong aqueous solution 104 in the vicinity of the steam generator 105, whereby the continuous generation of the steam is carried on in the manner described previously. 113 is a turbine shaft and 114, a thermal insulation wall. The above components are technically similar to those of the concentration difference energy engine described previously. During the time when the strong solution fed into the aqueous solution tank 103 is weakened to the solution having an initial concentration, the strong aqueous solution may absorb the steam equal in weight the steam evaporated from the weak aqueous solution in the process of enriching. Therefore any quantity of steam may be converted into power regardless of the fact where the aqueous solution was enriched.

Still referring to FIG. 5, the exhaust gas is delivered through an exhaust gas duct 115 from an internal combustion engine or a power plant in a factory, and a moderate-temperature concentrating pipe 116 is extended through the duct 115 from one side wall remote from the steam generator 105 of the aqueous solution tank 103 so that the aqueous solution 104 flows through the concentrating pipe 116 by the natural circulation or convection and heated by the exhaust gases flowing through the duct 115, whereby water within the solution is evaporated and the aqueous solution is enriched or concentrated.

A high-pressure tank 117 is disposed at the upstream of the aqueous solution tank 103 with respect to the flow of the exhaust gases in the duct 115, and the aqueous solution 118 in the high-pressure tank 117 is delivered through a valve 119 into the aqueous solution tank 103. The aqueous solution in the tank 103 is supplied through a feed pump 120 into the high-pressure tank 117. A high-temperature concentrating pipe 117 is extended from the high-pressure tank 117 into the duct 115, and the aqueous solution 118 in the tank 117 flows therethrough by the natural circulation or connection, whereby the aqueous solution may be heated and enriched. The steam generated in the high-pressure tank 117 is delivered through a steam pipe 122 and valve 123 into the steam turbine 108.

A low-pressure tank 124 containing aqueous solution is disposed at the downstream of the aqueous solution tank 103 with respect to the flow of the exhaust gases in the duct 115, and has a low-temperature concentrating pipe 125 extended through the duct 115, whereby the aqueous solution in the low-pressure tank 124 may be heated by the exhaust gases and enriched.

A part of the aqueous solution 104 in the aqueous solution tank 103 flows into a drain pipe 126 and into the low-pressure tank 124 through a heat exchanger 127 and a valve 128.

The steam generated in the low-pressure tank 124 is delivered through a pipe 129 into a condenser 130 and is condensed giving off the heat to the cooling water circulating through cooling pipe 131. The condensed water is stored in a pocket 132, to which is delivered the water separated in the separator 110. The condensed water in the pocket 132 is delivered through a feed pump 133 and a heat exchanger 134, where the water is heated by the exhaust gases flowing through the duct 115, to the steam generator 105 in the aqueous solution tank 103.

The enriched aqueous solution in the low-pressure tank 124 is delivered through a feed pump 135 and the heat exchanger 127 into the aqueous solution tank 103.

The overflow steam in the aqueous solution tank 103 is delivered through a pipe 136 into a condensation coil 137 disposed within the low-pressure tank 124 so that the dissipation of the heat of the overflow steam may facilitate the enrichment of the aqueous solution in the low-pressure tank 124. After the heat transferred, the overflow steam is condensed and the condensed water is delivered through a valve 138 and a pipe 139 to the pocket 132 in the condenser 130.

The excess steam in the stream turbine 108 is delivered from the outlet thereof through a pipe 140 to a second condensation coil 142 disposed in the low-pressure tank 124. Therefore the steam delivered to the steam turbine 108 in excess of the amount to be absorbed by the aqueous solution in the tank 103 may give off its heat to the aqueous solution in the low pressure tank, whereby the enrichment of the aqueous solution in the low pressure tank 124 may be further facilitated. The water condensed in the second condensation coil 142 is delivered through a valve 143 and a pipe 144 to the pocket 132 in the condenser 130. Fresh pure water may be supplied to the pocket 132 through a feed pump 145 if so required.

The pressure inside the aqueous solution tank 103 is maintained at a level substantially equal to the atmospheric pressure through vacuum breakers 146 and 147.

Instead of the exhaust gases discharged from the thermal combustion engine or the like, any other heat sources such as the solar energy, the terrestrial heat including the utilization of very small temperature differences in the ocean and even the heat liberated from the waste disposal systems, the wind power, and electric power generated in excess of the demand and so on may be utilized.

Next the mode of operation of the hybrid engine shown in FIG. 5 will be described. It is assumed that the boiling temperature elevation of the strong aqueous solution in the tank 103 be maintained at 65° at the average and that the pressure inside the aqueous solution tank 105 be maintained at the atmospheric pressure. Then the temperature of the aqueous solution 104 in the tank 103 is 165° C., and the temperature of the steam delivered from the steam generator 105 is 150° C. (= 165° C. − 15° C., the latter being the temperature difference between the aqueous solution in the tank and the steam in the generator) and the pressure of the steam is 4.85 Kg/cm$^2$. The steam is delivered to the steam turbine 108 and the steam exhausted therefrom has a pressure substantially equal to the atmosheric pressure and is returned through the exhaust pipe 109, the separator 110 and the pipe 111 and injected into the aqueous solution 104 through the nozzle holes 112. The latent heat of the steam is dissipated by the aqueous solution 104 so that its temperature is maintained at a level very close to the boiling point 165° C. and the steam generation in the steam generator 105 is carried on. In the steam generator 105 it requires 505 KCal to generate one kilogram of steam, whereas when one kilogram of steam is absorbed by the aqueous solution whose boiling point is increased by 65° C., the steam dissipates about 728 KCal. Therefore even when a work about 80 KCal/Kg is done in the steam turbine, the quantity of heat liberated by the steam when absorbed by the aqueous solution is the quantity of heat absorbed by the steam when generated so that as long as the strong aqueous solution is supplied to the aqueous solution tank 103, the steam turbine 108 keeps its rotation.

The pressure inside the high temperature concentrating pipe 121 is maintained 6 Kg/cm$^2$ and the saturation temperature of pure water is 158° C. Therefore with the aqueous solution whose boiling point is increased by 65° C. at the average, the steam is generated when the temperature reaches about 223° C. and the steam having the termperature of 223° C. and the pressure of 6 Kg/cm$^2$ is delivered to the steam turbine. That is, when the temperature of the exhaust gases flowing through the duct 115 is higher than 223° C., the concentration or enrichment of the aqueous solution in the high-temperature state or high-pressure tank 117 may be effected. In the moderate-temperature stage, the boiling point of the aqueous solution is 165° C. so that the concentration or enrichment of the aqueous solution in the moderate-temperature concentrating pipe 116 may be effected when the temperature of the exhaust gases passing over the pipe 116 is higher than 165° C.

In the low-temperature stage, the concentration or enrichment of the aqueous solution may be effected when the temperature thereof in the low pressure tank 124 is 90° C. and the temperature of the water condensed in the condenser 130 is less than 25° C. When the temperature of the exhaust gases flowing over the low-temperature condensation pipe 125 is higher than 90° C., the enrichment of the aqueous solution is possible. The steam having the temperature of 100° C. and the pressure almost equal to the atmospheric pressure is delivered to the first and second condensation coils 137 and 142 disposed within the low pressure tank 124 so that the enrichment of the aqueous solution within the low pressure tank 124 is possible.

When the aqueous solution enriched by the evaporation of one kilogram of steam is delivered from the high pressure tank 117 to the aqueous solution tank 103, the steam about one kilogram weight is generated. The aqueous solution 104 in volume sufficient to produce one kilogram of steam is delivered through the drain pipe 126, the heat exchanger 127 and the valve 128 to the low-pressure tank 124 so that the strong aqueous solution capable of generating about one kilogram of steam may be prepared in the low-pressure tank 124. The strong aqueous solution is delivered by the pump 135 to the aqueous solution tank 103 through the heat exchanger 127. Thus, the generation of one kilogram of the steam in the high-temperature stage results in the deliver of about three kilograms of steam to the steam turbine 108.

In like manner, the generation of about one kilogram of the steam in the moderate-temperature stage results in the delivery of about two kilograms of steam to the turbine 108. The generation of one kilogram of steam in the low-temperature stage results in the delivery of about one kilogram of steam to the steam turbine 108. As a result, the generation of one kilogram of steam in each of the high-, moderate- and low-temperature stages results in the delivery of 6 kilograms of steam to the steam turbine 108. Thus the waste heat may be very effectively recovered and utilized. In other words, the efficiency in conversion of the waste heat into useful mechanical output may be remarkably improved by the concentration or enrichment of the aqueous solution at various temperature levels.

On the other hand, the utilization of waste heat in a water Rankine engine results in a low-temperature stage of the steam turbine which is tremendously huge in construction. Furthermore the temperature of the steam discharged from the last stage is still considerably high. As a result, the power conversion rate or thermal efficiency is about one half as compared with the hybrid engine shown in FIG. 5. In the Freon Rankine cycle engines, the excessively high temperature exhaust gases cannot be utilized, resulting in the decrease in pressure ratio of the steam turbine. Therefore the power conversion rate or thermal efficiency is about two-thirds of that of the engine shown in FIG. 5.

It is to be understood that the present invention is not limited to the arrangement of the concentration difference engine shown in FIG. 5, that instead of the three-stage enrichment of the aqueous solution, the enrichment may be accomplished in any desired number of stages and that the aqueous solution tank 103 may be a pressure vessel capable of withstanding the pressure of the order of about two to three kilograms per square centimeter.

When the concentration difference energy engine of the type shown in FIG. 1 is used only in one stage, the increase in boiling point ΔT° C. is small so that the aqueous solution having a small capacity of absorbing the steam cannot be used as an effective working liquid. In the conventional multistage condensing boilers used for power generation, the aqueous solution is sprayed to absorb the steam so that the steam absorption capability is low and consequently the low efficiency results.

To overcome the above and other problems encountered in the conventional multistage condensing boilers, the inventor deviced a multistage concentration difference energy engine or power plant wherein the steam injection system is employed in order to improve the steam absorption capability. The multistage concentration difference energy engine or power plant in accordance with the present invention may recover very effectively the low-density thermal energies and thermal energies which vary from time to time for generating the high pressure steam, and may utilize various heat sources with temperatures changing over a wide range, whereby very effective and efficient recovery of energy may be attained.

The present invention as applied to a three-stage concentration difference energy engine (power plant) will be described with reference to FIG. 6. It comprises a high- or upper-stage aqueous solution tank 148, an intermediate-stage aqueous solution tank 155, a low-stage aqueous solution tank 162, a pure water tank 178, a strong aqueous solution tank 188 and a steam engine 173 with an output shaft 174. The high-stage, intermediate-stage and low-stage aqueous solution tanks 148, 155 and 162 are substantially similar in construction. Each aqueous solution tank 148 (155, 162) contains aqueous solution 149 (156, 163) and has a pure water boiler 150(157, 164) containing pure water 151 (158, 165), a preheater 175 (176, 177) and a nozzle 152 (159, 166) with a plurality of nozzle holes. Instead of the drum type boilers 150, 157 and 164 shown in FIG. 6, any other suitable boilers may be used, and the preheaters 175, 176 and 177 may be of any type as far as they can give the thermal energy to the aqueous solution 149, 156 and 163 in the tanks 148, 155 and 162.

The steam generated in the pure water boiler 150 in the high-stage aqueous solution tank 148 is delivered through a steam pipe 168 and valve 169 to a plant where the steam is needed through a steam pipe 170 and a valve 171 and to a steam engine 173 through a steam pipe 172. The steam discharged from the steam engine 173 is returned through a discharge pipe 167 and injected through the nozzle 166 in the aqueous solution 163 in the low-stage aqueous solution tank 162. The steam generated in the pure water boiler 164 in the low-stage aqueous solution tank 162 is delivered through a steam pipe 161 and a valve 160 and is injected through the nozzle 159 into the aqueous solution 156 in the intermediate stage aqueous solution tank 155. In like manner, the steam generated in the pure water boiler 157 in the intermediate-stage aqueous solution tank 155 is delivered through a steam pipe 154 and a valve 153 and is injected through the nozzle 152 into the aqueous solution 149 in the high-stage aqueous solution tank 148.

Pure water 179 stored in the pure water tank 178 is fed by a feed pump 181 into the low-stage pure water boiler 164 through a feed pipe 182 and a reducing valve 183, into the intermediate-stage pure water boiler 157 through a feed pipe 184 and a reducing valve 185 and into the high-stage pure water boiler 150 through a feed pipe 186 and a reducing valve 187.

Strong aqueous solution 189 stored in the strong aqueous solution tank 188 is fed by a feed pump 191 through a feed pipe 190 into the low stage aqueous solution tank 162 through a heat exchanger 211, a feed pipe 192 and a reducing valve 193, into the intermediate stage aqueous solution tank 155 through a heat exchanger 210, a feed pipe 194 and a reducing valve 195 and into the high-stage aqueous solution tank 148 through a heat exchanger 209, a feed pipe 196 and a reducing valve 197.

The weak aqueous solution in the high-stage aqueous solution tank 148 is returned through a return pipe 208, the heat exchanger 209, a reducing valve 205 and return pipes 204 and 200 into the weak aqueous solution tank 198 containing weak aqueous solution 199. In like manner, the weak solution in the intermediate-stage tank 155 is returned through a return pipe 207, the heat exchanger 210, a reducing valve 203, a return pipe 202 and the return pipe 200 into the weak solution tank 198. The weak solution in the low-stage tank 162 is returned through a return pipe 206, the heat exchanger 211, a reducing valve 201 and the return pipe 200 into the weak solution tank 198.

Next the mode of operation of the engine (power plant) with the above construction will be described. With the valves 153, 160, 169 and 171 closed, the preheaters 175, 176 and 177 are energized to heat the aqueous solution 149, 156 and 163 in the high-, intermediate- and low-stage tanks 148, 155 and 162 to the saturation temperature under the operating pressure. After the saturation temperature is reached, the valves 169, 153 and 160 are opened so that the steam generated in the high-stage pure water boiler 150 is delivered to the steam engine 173, and the steam exhausted therefrom is returned through the exhaust pipe 167 and injected through the nozzle 166 into the aqueous solution 163 in the low-stage aqueous solution tank 162. The latent heat of the steam injected is transfered by the aqueous solution 163 the latent heat of which is in turn transfered by the pure water boiler 164 so that the pure water 165 in the boiler is evaporated near at the boiling temperature of the aqueous solution 163. The above operation is same with that of the engine (power plant) described with reference to FIG. 1.

The steam generated in the pure water boiler 164 in the low-stage tank 162 is delivered through the steam pipe 161 and the valve 160 and is injected through the nozzle 159 into the aqueous solution 156 in the intermediate stage tank 155. Therefore as with the case of the low-stage tank 162, the pure water 158 in the pure water boiler 157 is evaporated near at a temperature higher than the temperature of the steam generated in the low-stage pure water boiler 164 by the increase in boiling point $\Delta T°$ C. The steam is delivered through the steam pipe 154 and the valve 153 into the upper-stage tank 148 where the steam is injected through the nozzle 152 into the aqueous solution 149. Therefore the temperature of the steam generated in the upper stage pure water boiler 150 is higher than the temperature of the steam delivered from the intermediate-stage pure water boiler 157 by the increase in boiling temperature $\Delta T°$ C. The steam generated in the upper-stage pure water boiler 150 is delivered through the steam pipe 168, the valve 169 and the steam pipe 172 into the steam engine 173. The steam exhausted from the steam engine 173 is returned to the low-stage aqueous solution tank 162.

When the strong aqueous solution 189 is fed by the feed pump 191 into the aqueous solution tanks 148, 155 and 162 and the weak aqueous solution is returned from them to the weak aqueous tank 198, the above concentration difference energy cycle continues without the supply of heat from the outside as with the case of the single-stage concentration difference energy engine (power plant). It is to be understood that the strong aqueous solution may be fed into the aqueous tanks 148, 155 and 162 in any suitable manner.

Figure 6:
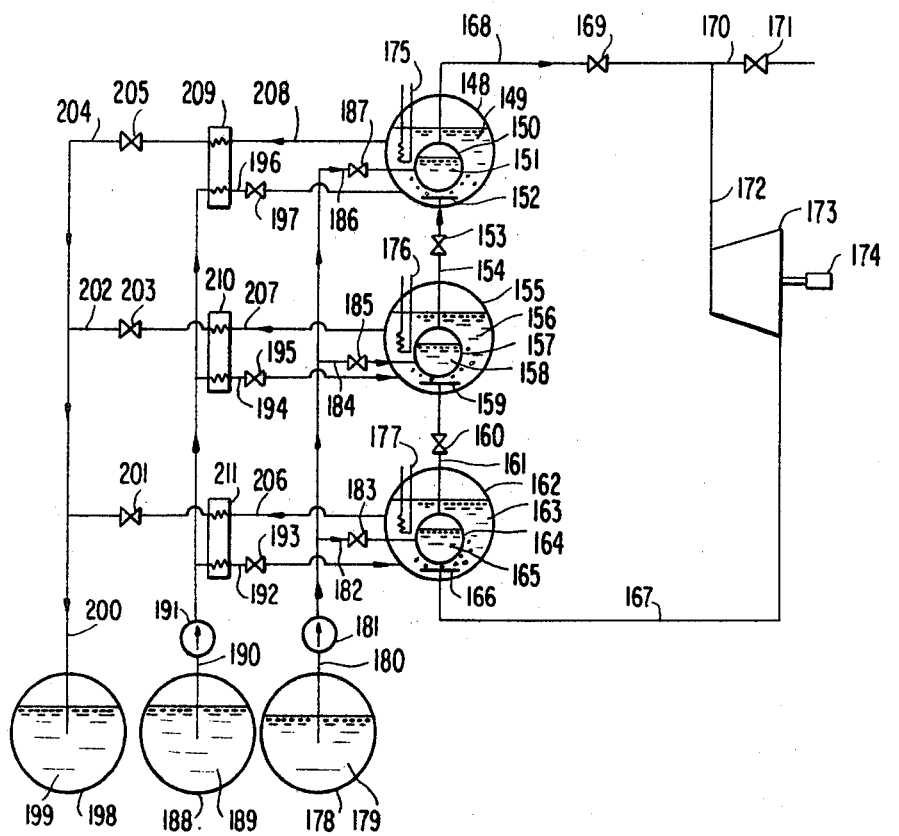
FIG. 6 is a diagram of a multistage concentration difference energy power plant.
Figure 7:
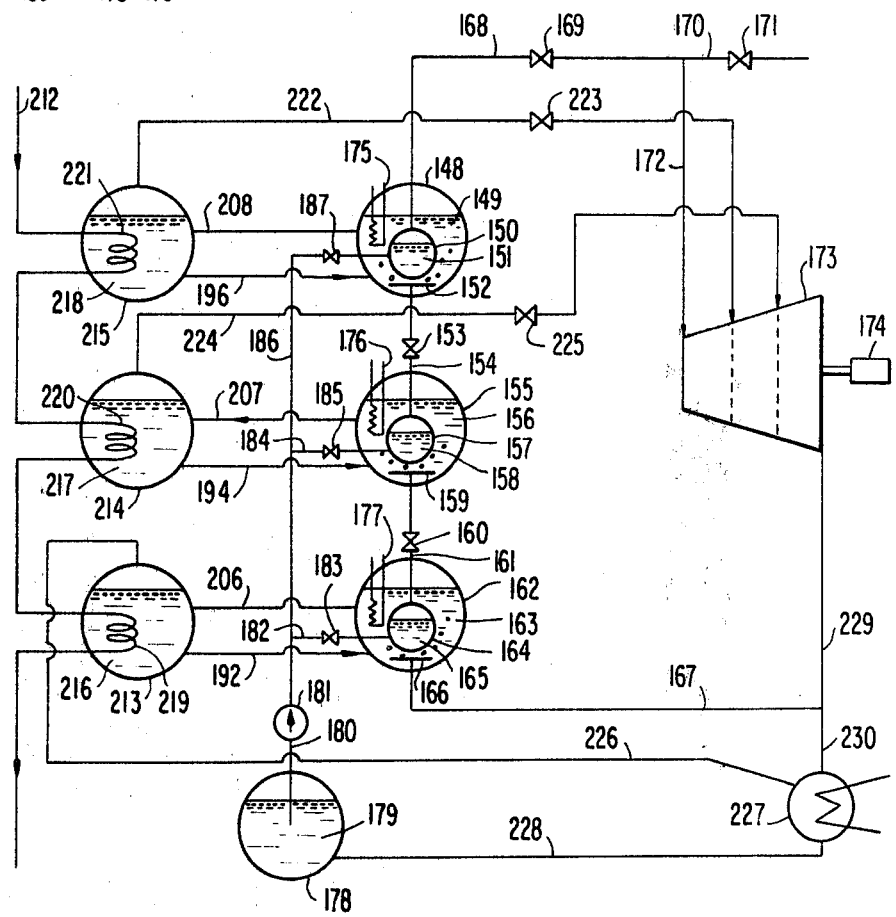
FIGS. 7 and 8 show modifications of the embodiment shown in FIG. 6, respectively.

In FIG. 7 there is shown a modification of the concentration difference energy engine (power plant) for utilizing waste heat, and same reference numerals as those used in FIG. 6 are used to designate similar parts. Instead of the strong and weak aqueous solution tanks, three concentrators 213, 214 and 215 are provided so that the heat from a waste heat source 212 may be transferred through heat exchangers 219, 220 and 221 to aqueous solutions 216, 217 and 218 to enrich them. The enriched or strong aqueous solutions are fed through the feed pipes 192, 194 and 196 into the aqueous solution tanks 162, 155 and 148, respectively, by the natural circulation. If required, feed pumps may be inserted in these feed pipes 192, 194 and 196. The weak solutions are returned from the aqueous solution tanks 162, 155 and 148 through return pipes 206, 207 and 208, respectively, into the concentrators 213, 214 and 215.

The steam generated in the concentrator 215 is delivered through a steam pipe 222 and a valve 223 to the intermediate stage of the steam engine. In like manner the steam generated in the concentrator 214 is delivered through a steam pipe 224 and a valve 225 to the lower stage of the steam engine 173. The steam generated in the low-stage concentrator 213 is delivered through a steam pipe 226 to a condenser 227 and the condensed water is fed through a feed pipe 228 into the pure water tank 178. A part of the exhaust steam from the steam engine 173 is delivered through an exhaust pipe 229 and the steam pipe 167 to the low-stage tank 162 and the remaining part is delivered through a pipe 230 into the condenser 227, and the condensed water is fed through the feed pipe 228 into the pure water tank 178.

In the embodiment shown in FIG. 7, not only a multistage absorption but also a multistage enrichment or concentration are effected so that the efficiency for recovering the waste heat may be considerably improved.

Figure 8:
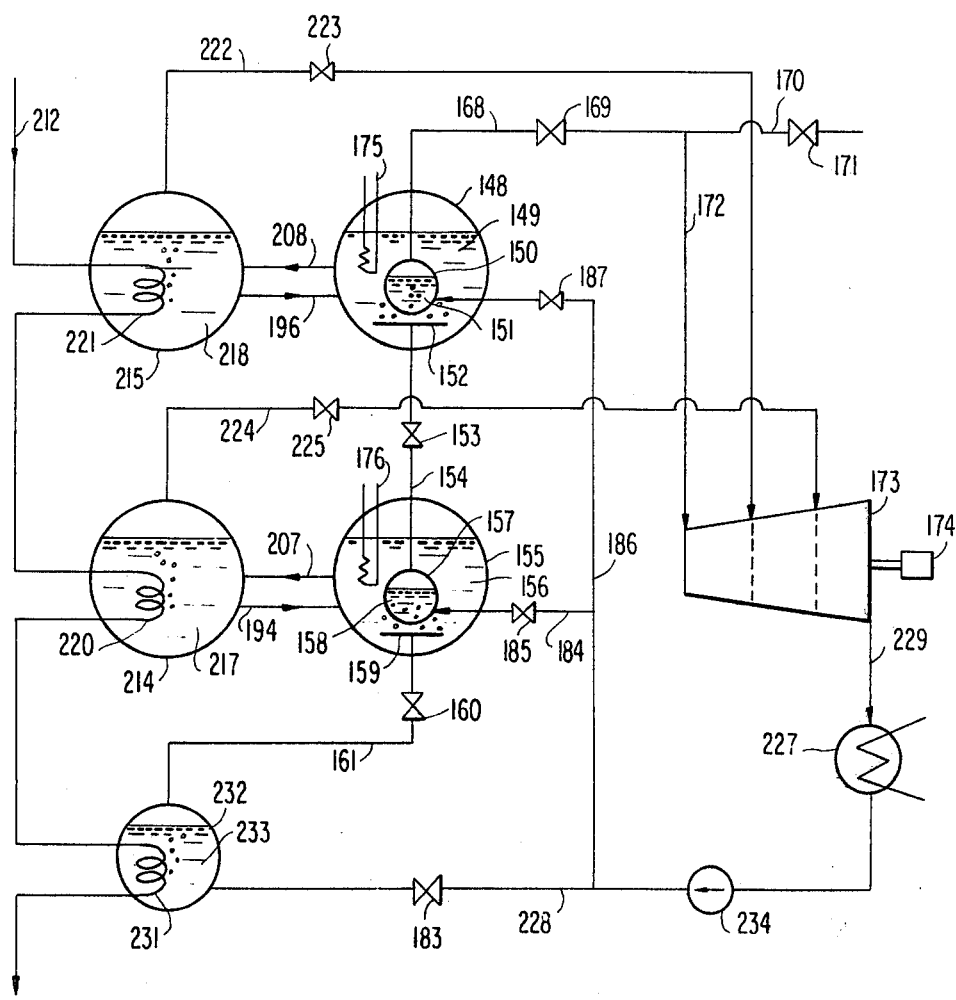

In FIG. 8 there is shown a modification of the embodiment shown in FIG. 7 which may exhibit considerably higher efficiency than the embodiment shown in FIG. 7 when a cooling water is available to sufficiently decrease the pressure of the steam in the condenser. When the pressure in the condenser 227 is decreased, the pressure inside the lower-stage aqueous solution tank 162 becomes almost equal to the pressure inside the condenser 227 so that the injection of the steam into the tank 162 becomes difficult.

The modification shown in FIG. 8 is different from the embodiment shown in FIG. 7 in that the lower-stage aqueous solution tank 162 and the concentrator 213 are eliminated so that the waste heat used for enriching the aqueous solution 216 in the concentrator 213 is used for evaporating pure water 233 in a pure water boiler 232 through a heat exchanger 231 and in that all of the steam discharged from the steam engine 173 is delivered to the condenser 227 through the exhaust pipe 299 and the condensed water is fed by a feed pump 234 into the pure water tank 232 through the feed pipe 228 and the valve 183, into the pure water boiler in the intermediate-stage tank 155 through the feed pipe 184 and the valve 185 and into the pure water boiler 150 through the feed pipe 186 and the valve 187.

The steam generated in the pure water boiler 232 is delivered through the pipe 161 and the valve 160 into the aqueous solution tank 155 and is injected into the aqueous solution 156 through the nozzle 159. The steam generated in the concentrator 215 is delivered through a steam pipe 222 and a valve 223 to the intermediate stage of the steam engine 173. The steam generated in the concentrator 214 is delivered through a steam pipe 224 and a valve 225 to the last stage of the steam engine 173. The steam generated in the pure water boiler 150 in the upper-stage aqueous solution tank 148 is delivered through the steam pipe 168, the valve 169 and the steam pipe 172 to the first stage of the steam engine 173, but a part of the high pressure steam from the pure water boiler 150 may be delivered to other places where the steam is needed through the valve 171 and the steam supply pipe 170.

The power plants shown in FIGS. 7 and 8 may use any low temperature difference sources which exist in the nature and even the heat available from the disposal of waste.

The inventor also made extensive studies and experiments on media used in the concentration difference energy engines and systems (the power plants operated on the concentration difference energy) described above. The media which are used for recovering, accumulating, transporting and dissipating the thermal energy must meet various requirements such that (1) they must exhibit higher increase in boiling temperature, (2) they must be neutral, causing no corrosion, (3) they must be harmless, (4) they must not be inflamable; and (5) last but at least they must be available at less cost in large quantity. In addition to LiBr and LiCl which have been widely used in the absorption type refrigeration systems, taken into consideration and investigated are aqueous solutions of various salts such as $CaCl_2$, $MgCl_2$, $ZnCl_2$, hypo and so on aqueous solutions of strong alkalis such as NaOH, aqueous solutions of strong acids such as $H_2SO_4$, and an aqueous solution of ammonia. LiBr is very expensive, and even though LiCl is not so expensive as LiBr, but it is still expensive when used alone. $CaCl_2$ is available in large quantity at less cost, but its increase in boiling point which is the most important property of the media used in the concentration difference energy power plants is less than about 45° C., which is too low in practice. $MgCl_2$ is also available in large quantity at less cost, but it tends to be decomposed at temperatures higher than 120° C. The use of $ZnCl_2$ results in the corrosion problems, and the increase in boiling temperature of salts such as hypo is too low. The aqueous solutions of NaOH and $H_2SO_4$ exhibit the higher increase in boiling point and is therefore very attractive, but they cause serious corrosion problems. The aqueous solution of ammonia has a problem that its pressure becomes too high at temperatures above room temperature. Thus, the above media are quite unsatisfactory when used singly.

However, after the extensive studies and experiments, the inventor observed the facts that when LiCl which exhibits the higher increase in boiling point even though the cost is rather expensive is added to $CaCl_2$ which is available at the lowest cost, has no corrosion problem and is stable, the boiling point may be increased considerably satisfactorily without the appreciable increase in cost; and that when the operating temperature is less than a certain level (for instance, 120° C.), the addition in small quantity of $MgCl_2$ which is available at low cost to $CaCl_2$ results in the increase in boiling temperature by a few ° C. The media used in the present invention are therefore the aqueous solution of a mixture of $CaCl_2$ and LiCl and a mixture of $CaCl_2$ and $MgCl_2$.

Figure 9:
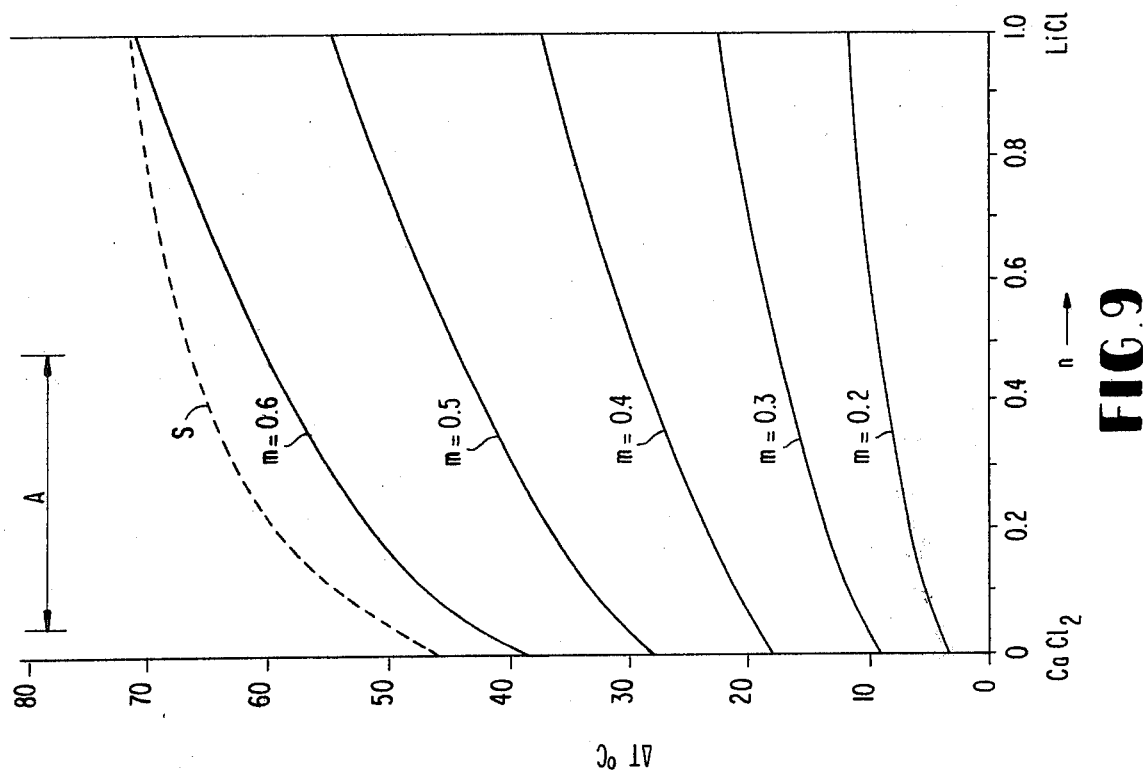

Next referring to FIG. 9, the results of the studies and experiments conducted by the inventor will be described. In FIG. 9, a fraction of LiCl with respect to $CaCl_2$ is plotted along the abscissa while the increase in boiling temperature $\Delta T°$ C. under atmospheric pressure is plotted along the ordinate with the concentration m of the aqueous solution used as a parameter. The broken line curve S indicates the maximum increase in boiling temperature when the aqueous solution is saturated.

From FIG. 9 it is seen that the addition of LiCl in small quantity to $CaCl_2$ results in the rapid increase in boiling temperature and the maximum increase in boiling temperature is increased accordingly. For instance, when LiCl is added about 5%, the maximum increase in boiling point reaches about 50° C. When the fraction of LiCl is 100%, the increase in boiling point reaches about 67° C.

With the increase in boiling point between about 50 and 60° C., the considerably satisfactory performance of the concentration difference energy power plant may be ensured so that the aqueous solution of $CaCl_2$ and LiCl may contain LiCl from about 5% to 100% by weight based on the weight of $CaCl_2$ or from 0.048 to 0.5 in terms of the n-fraction over the range indicated by A in FIG. 9.

Since the properties of LiBr are very similar to those of LiCl, LiCl may be partly or completely replaced with LiBr when the latter is easily available.

Figure 10:
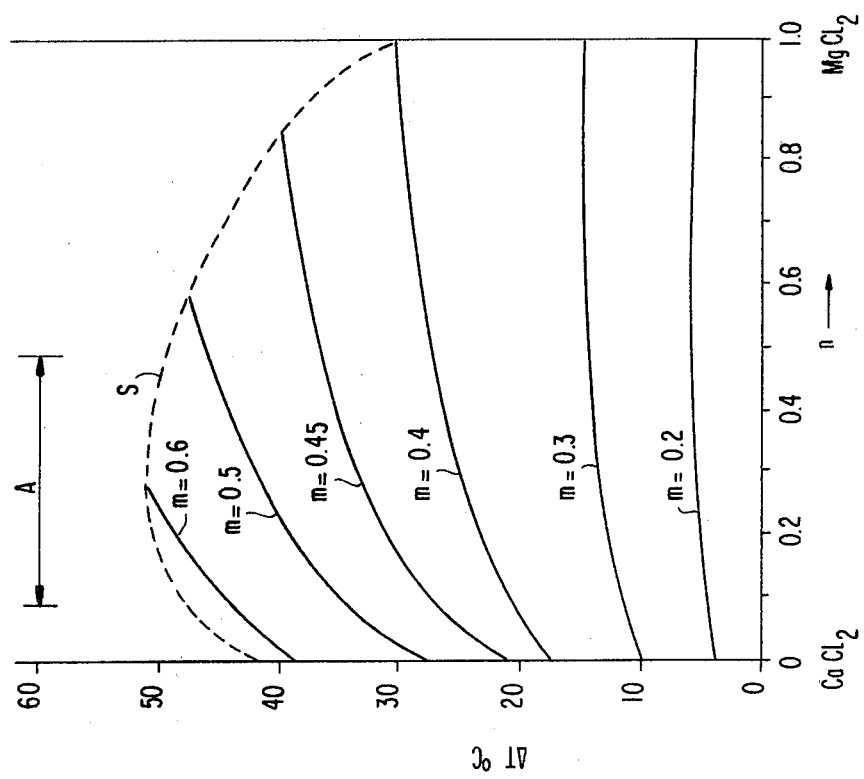
FIGS. 9 and 10 are diagrams used for the explanation of the media used in the present invention.

The composition-increase in boiling temperature diagram shown in FIG. 10 is for the aqueous solution of $CaCl_2$ and $MgCl_2$. When $MgCl_2$ which is generally available at the same low cost as $CaCl_2$ is added to $CaCl_2$ from about 10% to 100% by weight based upon the weight of $CaCl_2$, not only the increase in boiling point at various concentrations m but also the maximum increase in boiling point are also increased. The maximum increase in boiling point is about 50° C. Therefore when the operating temperature is less than 120° C., the $CaCl_2$-$MgCl_2$ aqueous solution with the ratio within the range A may be advantageously used. Furthermore, either of or both of LiCl and LiBr may be added in small quantity of the $CaCl_2$-$MgCl_2$ aqueous solution in order to increase further the maximum increase in boiling temperature.

In order to prevent the solidification of the above aqueous solutions at low temperatures, an organic aqueous solution containing ethylene glycol, glycerin or the like and having a high boiling temperature may be added.

As described above, the media used in the present invention may be available at low cost in large quantity, have a relatively high increase in boiling temperature, be neutral and harmless cause no corrosion problem and be stable within a certain temperature range. As a result, the performance of the concentration difference energy power plants in accordance with the present invention may be considerably improved, and the reduction in capital and operation costs may be attained.

The present invention has been so far described in detail with particular reference to preferred embodiments thereof but it will be understood that variations and modifications can be effected within the spirit and scope of the present invention as described hereinabove and as defined in the appended claims.

What is claimed is:

1. A multistage concentration difference energy engine comprising a plurality of aqueous solution tanks each of which includes a pure water boiler, means interconnecting said tanks so that the steam generated in the pure water boiler in the tank of a first stage may be injected through nozzles into the aqueous solution in the tank of an adjacent stage, and the steam generated in the pure water boiler in the last-named tank may be injected through nozzles into the aqueous solution in the tank in the next higher stage, and means for conducting steam generated in the pure water boiler in said tank in said latter stage to a steam engine, means for conducting exhaust steam from the steam engine through nozzles into the aqueous solution in the first stage tank, and means for feeding strong aqueous solution to each of said aqueous solution tanks.

2. A multistage concentration difference energy engine as set forth in claim 1 wherein the means for feeding the strong aqueous solution includes a plurality of concentrators, one for each aqueous solution tank, each concentrator containing an aqueous solution and a heat exchange device.

3. A medium used in the concentration difference energy engines defined in claim 1 wherein said medium is an aqueous solution prepared by dissolving into pure water a large quantity of $CaCl_2$ and LiCl in a quantity of about 5 to 100% by weight based upon the weight of $CaCl_2$.

4. A medium used in the concentration difference energy engines defined in claim 1 wherein said medium is an aqueous solution prepared by dissolving into pure water a large quantity of $CaCl_2$ and $MgCl_2$ in a quantity about 10 to 100% by weight based upon the weight of $CaCl_2$.

5. A multi-stage concentration difference energy engine comprising at least two aqueous solution tanks each of which includes a pure water boiler, means interconnecting said tanks so that the steam generated in the pure water boiler in the tank in one stage may be injected through nozzles into the aqueous solution in the tank of another stage, means for conducting steam generated in the pure water boiler of said another stage to a steam engine, means for condensing the exhaust steam from said engine, a pure water boiler separate from the pure water boilers of said tanks, means for delivering the condensate from the condensor to all of said pure water boilers, means for conducting steam generated in the separate pure water boiler through nozzles into the aqueous solution in the tank of said one stage, and means for feeding strong aqueous solution to each of said aqueous solution tanks.

6. A multi-stage concentration difference energy engine as set forth in claim 5 wherein the means for feeding the strong aqueous solution includes a plurality of concentrators, one for each aqueous solution tank, each concentrator containing an aqueous solution and a heat exchange device.

* * * * *